US008288897B1

(12) United States Patent
Lo

(10) Patent No.: US 8,288,897 B1
(45) Date of Patent: Oct. 16, 2012

(54) SMART SPEED CONTROL, POWER-SAVING AND NOISE-REDUCTION PAPER SHREDDER

(76) Inventor: Emily Lo, Hsin Chuang (TW)

( * ) Notice: Subject to any disclaimer, the term of this patent is extended or adjusted under 35 U.S.C. 154(b) by 320 days.

(21) Appl. No.: 12/710,364

(22) Filed: Feb. 23, 2010

(51) Int. Cl.
*H02B 1/24* (2006.01)

(52) U.S. Cl. ............ 307/131; 241/33; 241/36; 241/100; 241/236; 241/295

(58) Field of Classification Search ........................ None
See application file for complete search history.

(56) References Cited

U.S. PATENT DOCUMENTS

| | | | | |
|---|---|---|---|---|
| 2009/0127364 | A1* | 5/2009 | Zhong | 241/277 |
| 2010/0170967 | A1* | 7/2010 | Jensen | 241/25 |
| 2011/0062260 | A1* | 3/2011 | Pan | 241/30 |

* cited by examiner

*Primary Examiner* — Rexford Barnie
*Assistant Examiner* — Justen Fauth
(74) *Attorney, Agent, or Firm* — Pro-Techtor Int.'l Services

(57) ABSTRACT

The present invention discloses a smart speed control, power-saving and noise-reduction paper shredder, comprises an electric machine unit, a current inspection feedback unit, a gear-switching voltage-modulating and speed-regulating unit and a power supply, wherein an input terminal of the gear-switching voltage-modulating and speed-regulating unit is connected to an output terminal of the current inspection feedback unit, and an output terminal is connected to an input terminal of the electric machine unit; a paper shredder of the present invention applicable for an AC electric machine, an induction electric machine or a DC electric machine, wherein current required for paper shredding by the AC electric machine, the induction electric machine or the DC electric machine is detected, and the electric machine is adjusted to its best working condition, and a number of speeds including high, mid and low gears are provided and can be switched according to the actual load condition, so as to achieve the smart speed control, power saving and noise reduction effects.

4 Claims, 2 Drawing Sheets

SMART SPEED CONTROL, POWER-SAVING AND NOISE-REDUCTION PAPER SHREDDER

BACKGROUND OF THE INVENTION

1. Field of the Invention

The present invention relates to a smart speed control, power-saving and noise-reduction paper shredder, and more particularly to a paper shredder having a knife or another cutting or tearing component to divide pieces of paper into shreds.

2. Description of the Related Art

Conventional paper shredder generally comes with a single rotation speed, a constant number of pieces of shredding paper, and a constant power for the operation of an electric machine.

If the paper shredder has one or two piece of paper remained or rotates idly, the electric machine will rotate at a higher rotation speed, make a louder noise, and consume more electric power. In a paper shredder electric machine as disclosed in P.R.C. Pat. No. 201113903Y, a speed control system is provided for adjusting the speed of the electric machine manually. In a paper shredder as disclosed in P.R.C. Pat. No. 201181926Y, an automatic gear control system detects the rotating speed of the electric machine and maintains the rotating speed of the electric machine automatically by optical controls, so as to overcome the aforementioned issues of the conventional paper shredder. However, both of the issued patents control the speed of the electric machine by changing the number of coils of the electric machine, and thus these patented technologies can be applied for AC electric machines only, but not for DC electric machines.

SUMMARY OF THE INVENTION

Accordingly, the primary object of the present invention is to provide a smart speed control, power-saving and noise-reduction paper shredder applicable for an AC electric machine, an induction electric machine or a DC electric machine, wherein current required for paper shredding by the AC electric machine, the induction electric machine or the DC electric machine is detected, and the electric machine is adjusted to its best working condition, and a number of speeds including high, mid and low gears are provided and can be switched according to the actual load condition, so as to achieve the smart speed control, power saving and noise reduction effects.

DETAILED DESCRIPTION OF THE PREFERRED EMBODIMENTS

Figure 1:
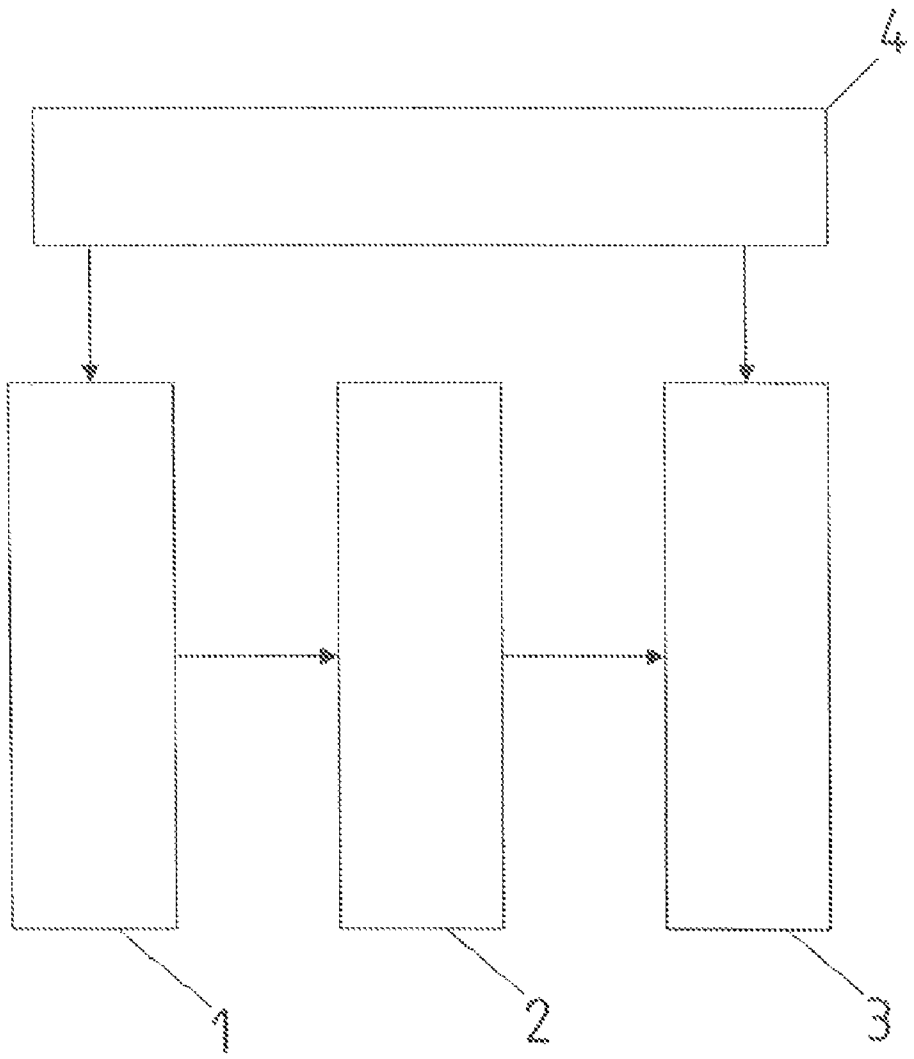
FIG. 1 shows a block diagram of the present invention.

With reference to FIG. 1, a paper shredder of the present invention comprises an electric machine unit 1, a current inspection feedback unit 2, a gear-switching voltage-modulating and speed-regulating unit 3 and a power supply 4, wherein an input terminal of the gear-switching voltage-modulating and speed-regulating unit 3 is connected to an output terminal of the current inspection feedback unit 2, and an output terminal is connected to an input terminal of the electric machine unit 1, and the current inspection feedback unit 2 is provided for inspecting a current when the electric machine unit 1 shreds paper, comparing the inspection results, and transmitting the inspection results to the gear-switching voltage-modulating and speed-regulating unit 3. After the gear-switching voltage-modulating and speed-regulating unit 3 receives the results, the gear is switched and the voltage is modulated automatically, and then the results are fed back to the electric machine unit 1 for adjusting the speed of the electric machine, so as to achieve the power saving and noise reduction effects.

Figure 2:
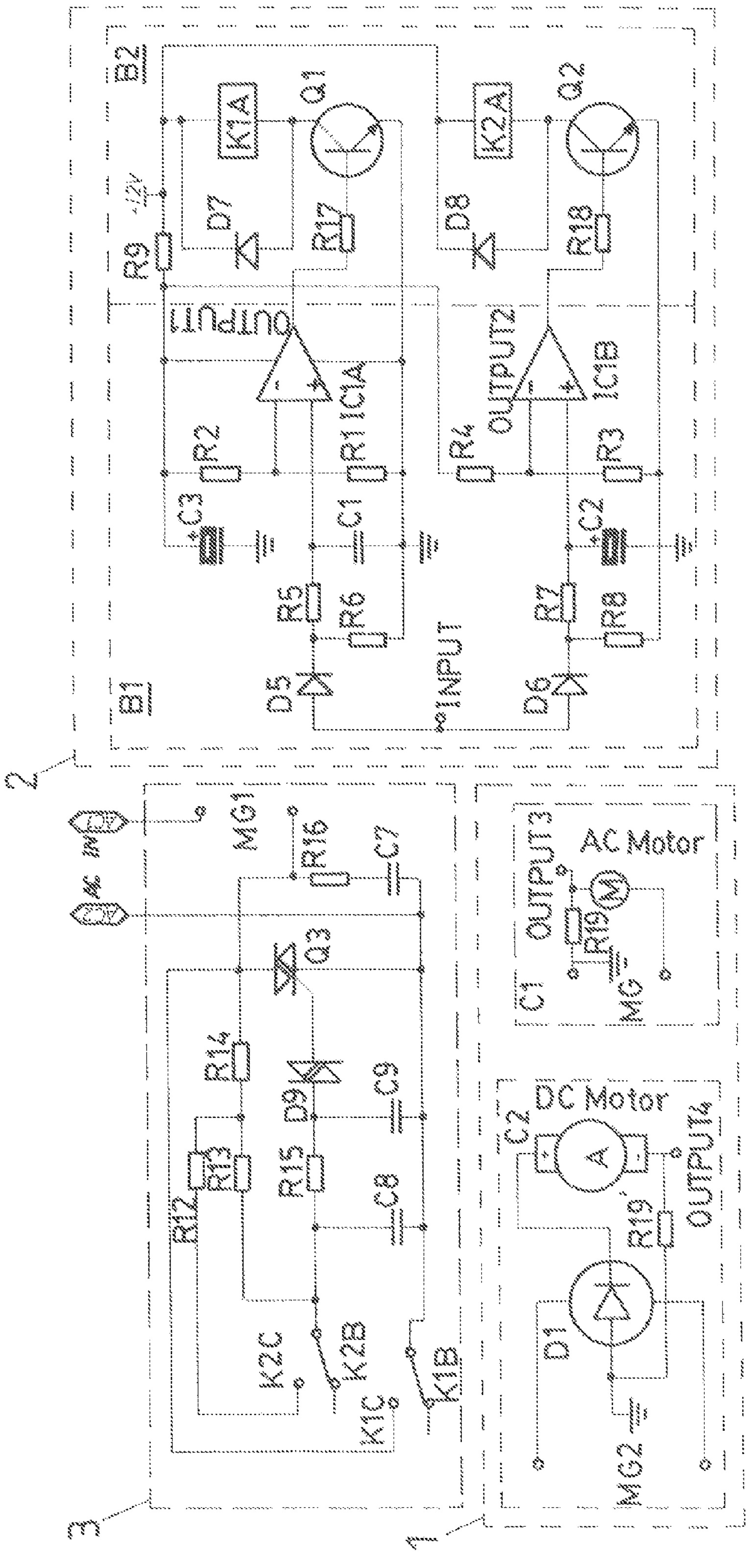
FIG. 2 shows a circuit diagram of the present invention.

With reference to FIG. 2, after a utility power AC IN is inputted, the electric power is supplied to the electric machine unit 1 and the gear-switching voltage-modulating and speed-regulating unit 3, and the voltage used by the current inspection feedback unit 2 is a 12-volt to 24-volt power supply obtained by stepping down the voltage of the utility power AC IN and regulating the voltage.

The current inspection feedback unit 2 includes a dual-channel comparator B1 and a dual-relay driver circuit B2, both composed of operational amplifiers, wherein a first control signal output terminal OUTPUT1 and a second control signal output terminal OUTPUT2 of the dual-channel comparator B1 are coupled to a control terminal of the dual-relay driver circuit B2, and a sample voltage input terminal INPUT of the dual-channel comparator B1 is connected to a current sample resistor R19 of an electric machine of the electric machine unit 1.

The dual-channel comparator B1 includes comparators IC1A, IC1B, wherein the voltage reference of the comparator IC1A is set to V0 volts, the voltage reference of the comparator IC1B is set to V1 volts, and V0 is greater than V1.

If the sample voltage V2 is smaller than V1 and the voltages are compared by the comparator B1, the control signal output terminal OUTPUT2, OUTPUT1 keeps and maintains a perfect low-level voltage at 0 volt.

If the sample voltage V2 is greater than V1 and smaller than V0 and the voltages are compared by the comparator B1, the control signal output terminal OUTPUT2 will output a high-level voltage approximately equal to 12 volts, and the control signal output terminal OUTPUT2 keep and maintain a perfect low-level voltage at 0 volt.

If the sample voltage V2 is greater than V0 and the voltage is compared by the comparator B1, the control signal output terminals OUTPUT2, OUTPUT1 will output a high-level voltage approximately equal to 12 volts.

The dual-relay driver circuit B2 includes an electronic switch circuit formed by connecting a first switch triode Q1 and its coil KIA in series with a first relay K1 of a primary circuit of the first switch triode Q1, and an electronic switch circuit formed by connecting a second switch triode Q2 and its coil K2A in series with a primary circuit of a second relay K2 of the second switch triode Q2, The contact module comprised of the frequent-close contacts KIB, K2B and the frequent-open contacts KIC, K2C of the first relay K1 and the second relay K2 is connected to the gear-switching voltage-modulating and speed-regulating unit 3.

If the control signal output terminals OUTPUT2, OUTPUT1 keeps and maintains a perfect low-level voltage at 0 volt, then the second switch triode Q2 and the first switch triode Q1 will not be electrically conducted, and the coils K1A, K2A of the first relay K1 and the second relay K2 will not be electrically connected.

If the control signal output terminal OUTPUT2 will output a high-level voltage approximately equal to 12 volts, the control signal output terminal OUTPUT1 keep and maintain a prefect low-level voltage at 0 volt, then the second switch triode Q2 and its coil K2A in series with a second relay K2 will be electrically conducted, and the first switch triode Q1 and its coil K1A in series with a first relay K1 will not be electrically conducted.

If the control signal output terminals OUTPUT2, OUTPUT1 will output a high-level voltage approximately equal to 12 volts, then the second switch triode Q2 and the first switch triode Q1 will be electrically conducted, and its coil K1A in series with a first relay K1 and its coil K2A in series with a second relay K2 will not be electrically conducted.

The electric machine unit 1 is a circuit unit C1 of an AC electric machine or an induction electric machine, or a circuit unit C2 of the DC electric machine.

The circuit unit C1 of the AC electric machine or the induction electric machine includes the AC electric machine or the induction electric machine M and windings of the AC electric machine or the induction electric machine connected in series with a current sample resistor R19 of the electric machine, and a terminal of the current sample resistor R19 of the electric machine is connected to a sample voltage input terminal INPUT of the dual-channel comparator B1, and another terminal of the current sample resistor R19 of the electric machine is connected to the ground.

The DC electric machine circuit unit C2 includes the DC electric machine A, a rectifier circuit D1 and windings of the DC electric machine A connected in series with a current sample resistor R19' of the electric machine, and a terminal of the current sample resistor R19' of the electric machine is connected to the sample voltage input terminal INPUT of the dual-channel comparator B1, and another terminal of the current sample resistor R19' of the electric machine is connected to the ground.

The gear-switching voltage-modulating and speed-regulating unit 3 includes a thyristor Q3 and its trigger control circuit, and an output circuit comprised of R16 and C7, wherein the trigger control circuit includes a bidirectional diode D9 and a thyristor conduction time adjusting circuit, thyristor conduction time adjusting circuit includes a plurality of voltage division resistors R13, R14, R15 and filter capacitors C8, C9 and a first relay installed in a current inspection feedback unit 2, and a contact module comprised of frequent-close contacts KIB, K2B and frequent-open contacts KIC, K2C of a second relay KI, K2, and an output terminal MG1 of an output circuit comprised of R16, C7 is connected to a voltage input terminal MG, MG2 of the electric machine unit 1.

The working process of the voltage output terminal MG1 of the gear-switching voltage-modulating and speed-regulating unit 3 connected in series with a voltage input terminal MG of the circuit unit C1 of the AC electric machine or the induction electric machine is described as follows. The working process of the voltage output terminal MG1 of the gear-switching voltage-modulating and speed-regulating unit 3 is substantially the same as the working process of the voltage input terminal MG2 connected in series with the circuit unit C2 of the DC electric machine.

If the coils K1A, K2A of the first and second relay K1, K2 are not electrically conducted, the first relay K1 and the second relay K2 will be situated at the frequent-close contacts K1B, K2B respectively, and a discharge circuits composed of selected resistors R13, R13 and C8 is used for electrically conducting a resistor R15 and a bidirectional diode D9 to control the electric conduction of the thyristor Q3 in order to change the voltage of the voltage output terminal MG1 of the thyristor Q3. Since the voltage output terminal MG1 is connected in series with the voltage input terminal MG of circuit unit C1 of the AC electric machine or the induction electric machine in order to change the speed of the AC electric machine or the induction electric machine A, the speed control effect can be achieved.

If the coil K2A of the second relay K2 is electrically conducted and the coil K1A of the first relay K1 is not electrically conducted, then the first relay K2 will be situated at the frequent-open contact K2C, and the relay K1 will be situated at a frequent-close contact K1B, and a discharge circuit composed of selected resistors R12, R13 and connected in parallel with a circuit and a C8 circuit which are connected in parallel with the selected resistors R12, R13 is used for electrically conducting a resistor R15 and a bidirectional diode D9 to control the electric conduction of the thyristor Q3, so as to change the voltage of the voltage output terminal MG1 of the thyristor Q3. Since the voltage output terminal MG1 is connected in series with the voltage input terminal MG of the circuit unit C1 of the AC electric machine or the induction electric machine, the speed of the AC electric machine or the induction electric machine A can be changed to achieve the speed control effect.

If the coils K1A, K2A of the first and second relays K1, K2 are electrically conducted, the first relay K1 and the second relay K2 will be situated at the frequent-open contacts K1C, K2C respectively, and the utility power AC2 is passed through the frequent-open contact K1C of the first relay K1 to the voltage output terminal MG1 of the thyristor Q3 to change the voltage of the voltage output terminal MG1. Since the voltage output terminal MG1 is connected in series with the voltage input terminal MG of the circuit unit C1 of the AC electric machine or the induction electric machine, the speed of the AC electric machine or the induction electric machine A can be changed to achieve the speed control effect.

In conclusion, the present invention smart speed control, power-saving and noise-reduction paper shredder provides a high generality that can be used for the AC electric machines and the induction electric machines, as well as for the DC electric machines. The invention can achieve the smart speed control, power saving, and noise reduction effects.

What is claimed is:

1. A smart speed control, power-saving and noise-reduction paper shredder, comprises an electric machine unit, a current inspection feedback unit, a gear-switching voltage-modulating and speed-regulating unit and a power supply, wherein an input terminal of the gear-switching voltage-modulating and speed-regulating unit is connected to an output terminal of the current inspection feedback unit, and an output terminal is connected to an input terminal of the electric machine unit wherein the current inspection feedback unit includes a dual-channel comparator and a dual-relay driver circuit, both composed of operational amplifiers, wherein a first control signal output terminal and a second control signal output terminal of the dual-channel comparator are coupled to a control terminal of the dual-relay driver circuit, and a sample voltage input terminal of the dual-channel comparator is connected to a current sample resistor of an electric machine of the electric machine unit.

2. A smart speed control, power-saving and noise-reduction paper shredder, comprises an electric machine unit, a current inspection feedback unit, a gear-switching voltage-modulating and speed-regulating unit and a power supply, wherein an input terminal of the gear-switching voltage-modulating and speed-regulating unit is connected to an output terminal of the current inspection feedback unit, and an output terminal is connected to an input terminal of the electric machine unit, wherein a dual-relay driver circuit includes an electronic switch circuit formed by connecting a first switch triode and its coil in series with a first relay of a primary circuit of the first switch triode, and an electronic switch circuit formed by connecting a second switch triode and its coil in series with a primary circuit of a second relay of the second switch triode.

3. The smart speed control, power-saving and noise-reduction paper shredder in accordance with claim 1, wherein the gear-switching voltage-modulating and speed-regulating unit includes a thyristor and its trigger control circuit, and an output circuit, wherein the trigger control circuit includes a bidirectional diode and a thyristor conduction time adjusting circuit, thyristor conduction time adjusting circuit includes a plurality of voltage division resistors and filter capacitors and a first relay installed in a current inspection feedback unit, and a contact module comprised of frequent-close contacts and frequent-open contacts of a second relay and an output terminal of an output circuit comprised is connected to a voltage input terminal of the electric machine unit.

4. The smart speed control, power-saving and noise-reduction paper shredder in accordance with claim 1, wherein electric machine unit is a circuit unit of an AC electric machine or an induction electric machine, or a circuit unit of the DC electric machine and wherein the circuit unit of the AC electric machine or the induction electric machine includes the AC electric machine or the induction electric machine and windings of the AC electric machine or the induction electric machine connected in series with a current sample resistor of the electric machine, and a terminal of the current sample resistor of the electric machine is connected to a sample voltage input terminal of a dual-channel comparator, and another terminal of the current sample resistor of the electric machine is connected to the ground.

* * * * *